United States Patent [19]

Villani

[11] Patent Number: 5,400,626
[45] Date of Patent: Mar. 28, 1995

[54] AUTOMOBILE ANTI-THEFT FUEL LINE VALVE LOCK

[76] Inventor: Fiorenzo L. Villani, 243 Deems Ave., Staten Island, N.Y. 10314

[21] Appl. No.: 115,511

[22] Filed: Sep. 1, 1993

Related U.S. Application Data

[62] Division of Ser. No. 910,630, Jul. 8, 1992, Pat. No. 5,311,756.

[51] Int. Cl.⁶ .................. B60R 25/04; F16K 35/02
[52] U.S. Cl. ........................................ 70/178; 70/202; 70/211; 70/242
[58] Field of Search .................. 70/175, 176, 177, 178, 70/179, 202, 203, 247, 242, 243, 211

[56] References Cited

U.S. PATENT DOCUMENTS

| | | | |
|---|---|---|---|
| 1,412,720 | 4/1922 | Szafranski | 70/176 |
| 2,129,229 | 9/1938 | Miller | 70/178 |
| 3,362,426 | 1/1968 | Polit et al. | 70/178 |
| 4,422,314 | 12/1983 | Cooper | 70/178 |

Primary Examiner—Peter M. Cuomo
Assistant Examiner—Darnell M. Boucher
Attorney, Agent, or Firm—Kuhn and Muller

[57] ABSTRACT

The subject invention is directed to a device for preventing the movement of a floor-mounted gear shift lever of an automobile from the "park" position to a position useful for operating the automobile. Five specific embodiments are of interest. The first embodiment includes an arcuate retaining lock which operates similar to a handcuff lock and which is mounted outside the gear shift lever console. The first embodiment includes a hingeable lock plate which is hingeably located behind the gear shift lever and which includes a semi-circular cutout portion for receiving the gear shift lever thereby preventing its rearward movement.

The second embodiment utilizes a similarly operating locking member but is contained within the gear shift lever console so as to be hidden from view. The third embodiment includes a lever activated housing to enclose and disable a gas pedal. The fourth embodiment includes a housing to enclose a gear shift handle, thereby preventing unauthorized operation of the automobile. In a fifth embodiment a lock disables the fuel line of an automobile to prevent the movement of the automobile.

1 Claim, 7 Drawing Sheets

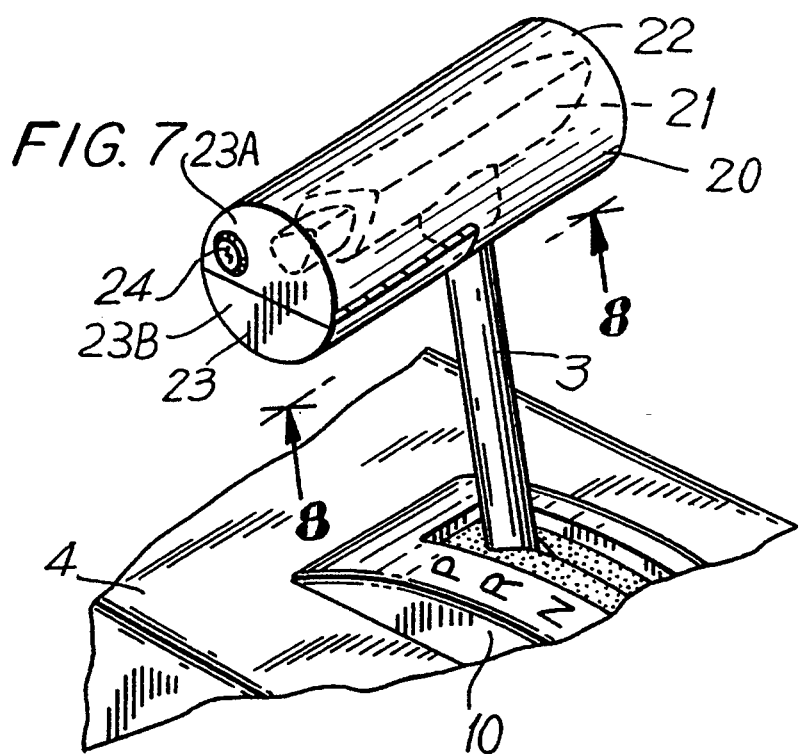
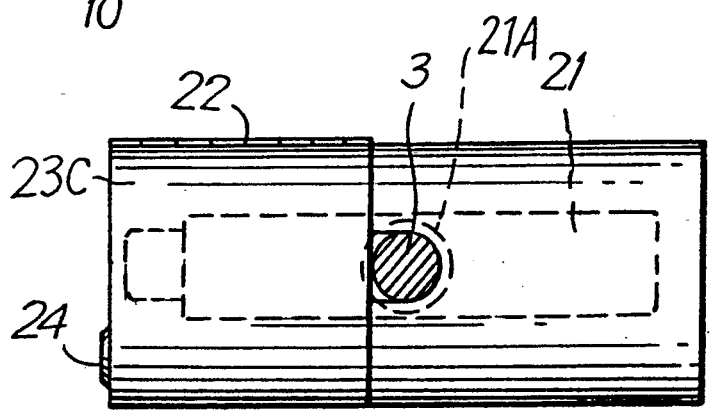
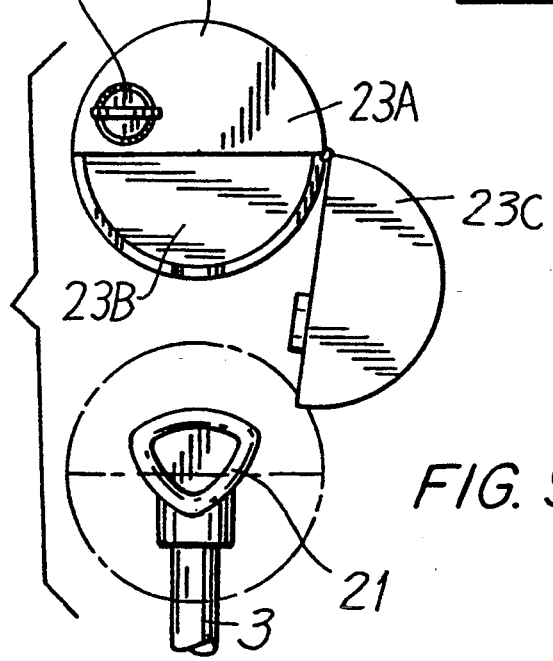

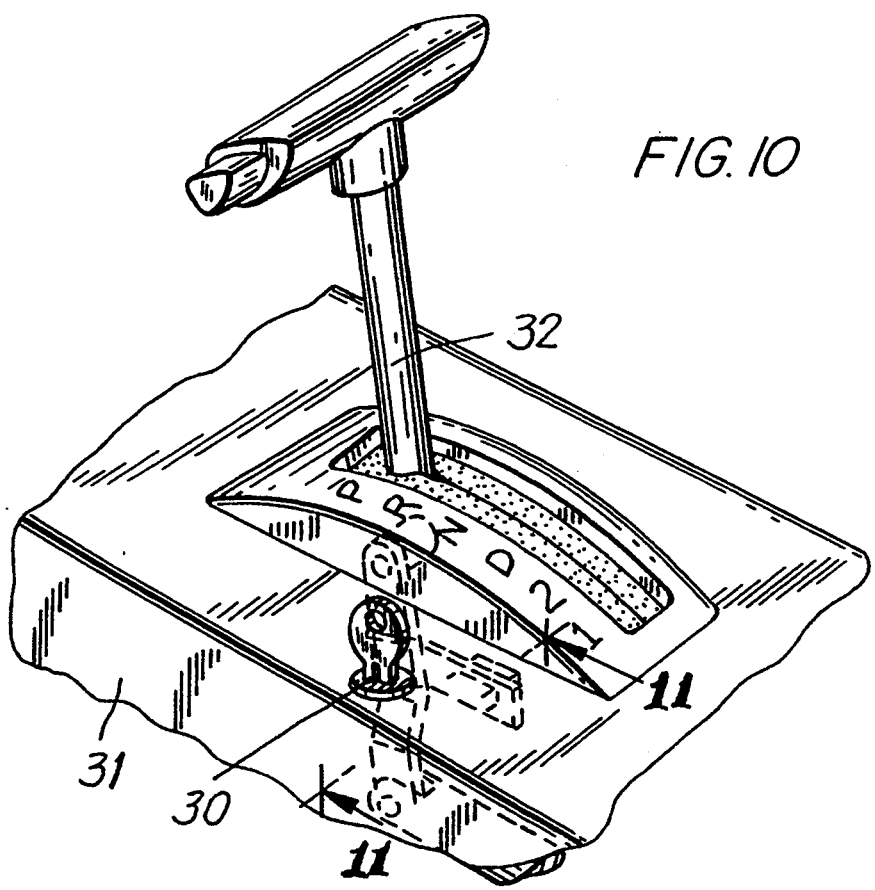
FIG. 10
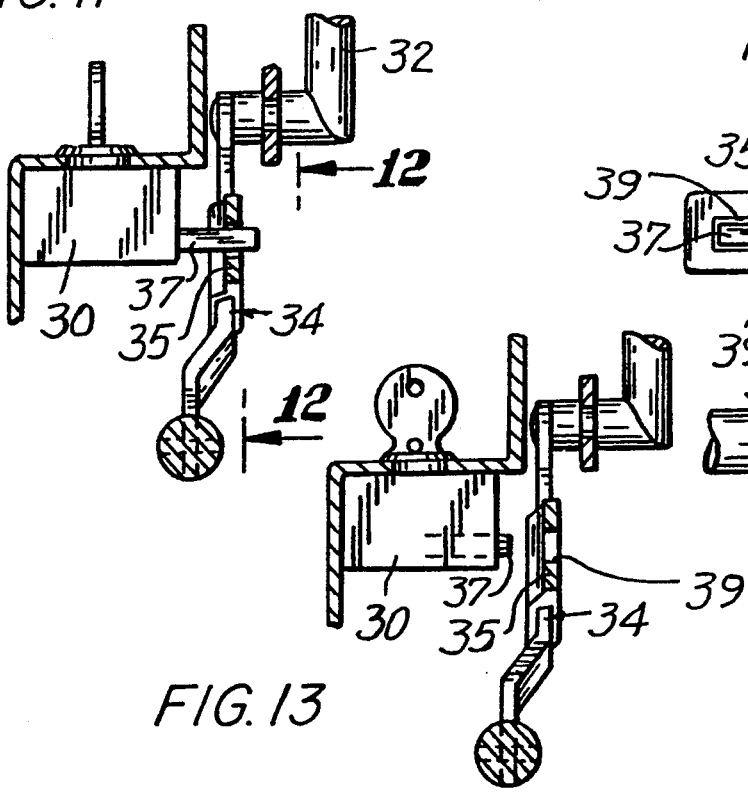
FIG. 11
FIG. 13
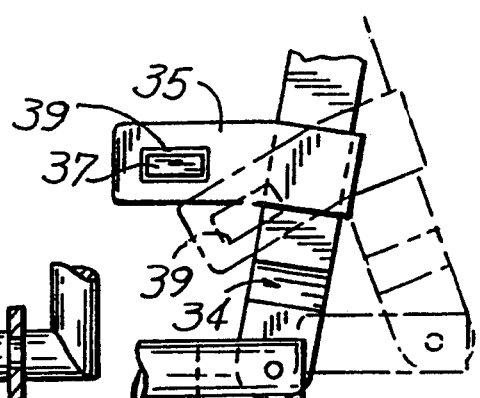
FIG. 12

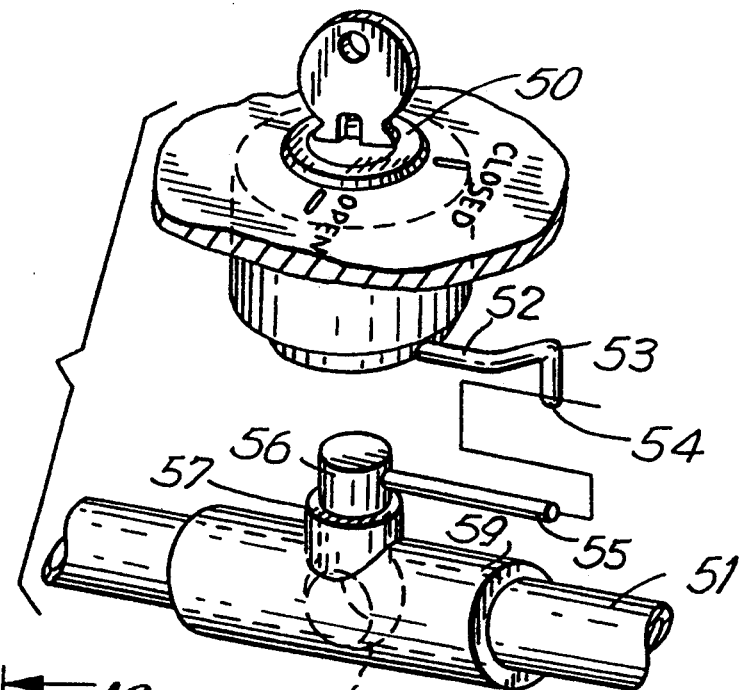
FIG. 17
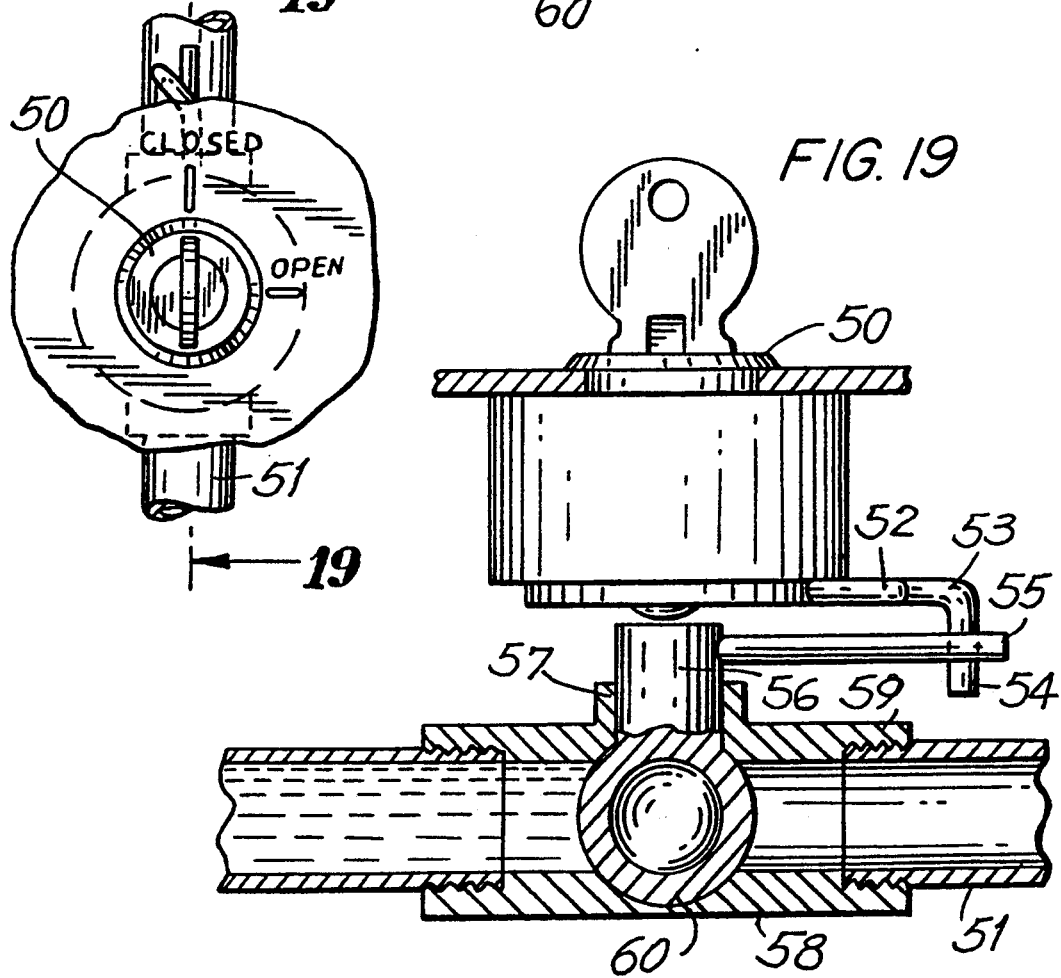
FIG. 18
FIG. 19

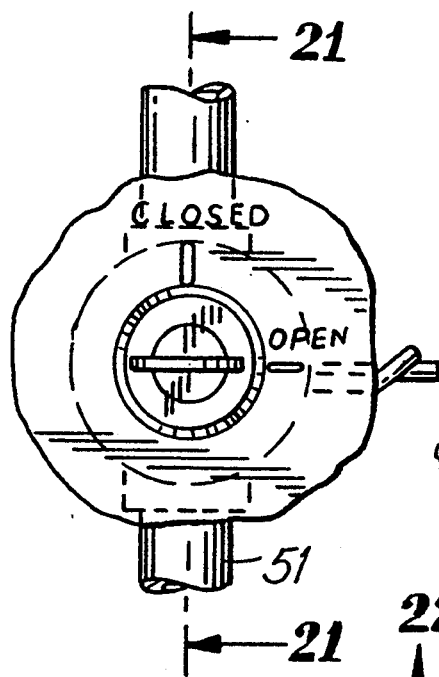
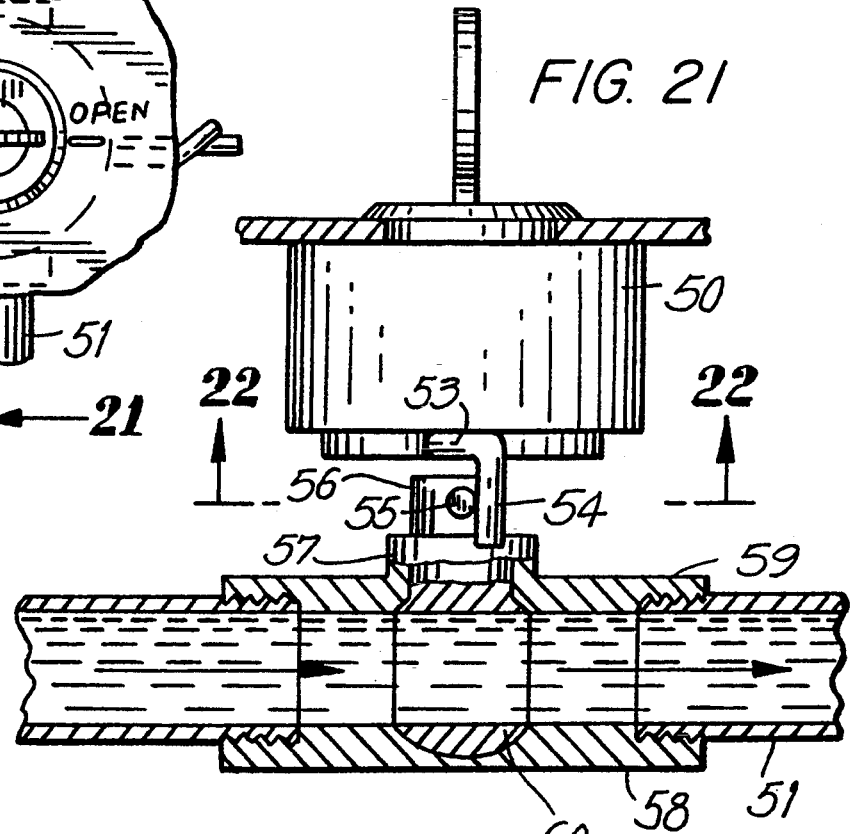
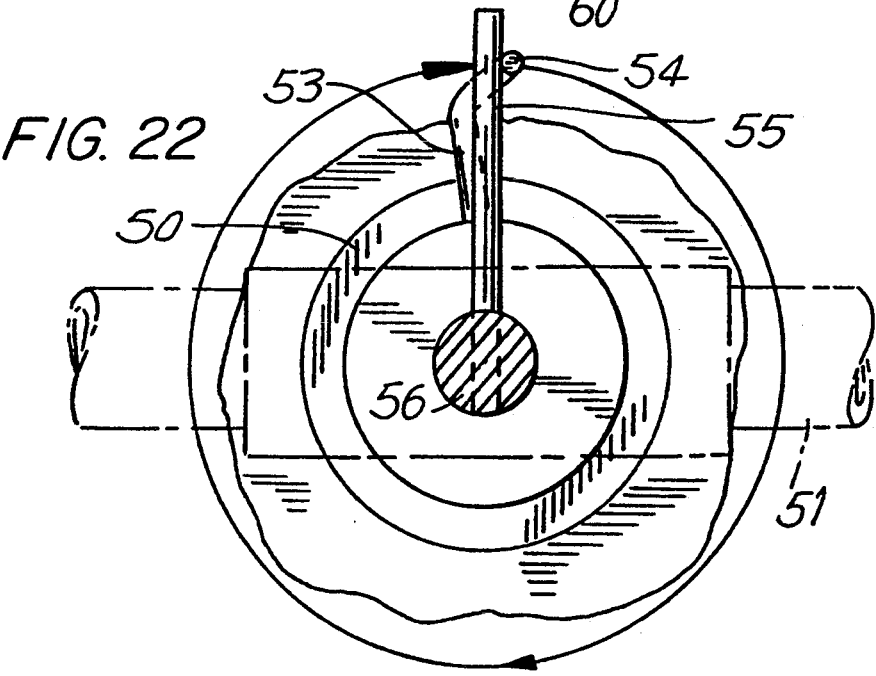

AUTOMOBILE ANTI-THEFT FUEL LINE VALVE LOCK

This application is a division of application Ser. No. 07/910630, filed Aug. 8, 1992, now U.S. Pat. No. 5,311,756.

BACKGROUND OF THE INVENTION

A device is provided for disabling activating members within a car by locking the members in place and preventing access to the activating members.

With the present invention, a thief can try and start a car, but can not drive the car away.

In addition, the device prevents children from accidently driving a car.

Moreover, even if a motor is running, the car will be disabled because activating members such as a gear shift lever, or gas pedal will be prevented from movement.

In the preferred embodiment, the present invention not only acts as a lock, but also provides a housing for a lock to prevent access to a lock. A lock is only as strong as it is resistant to tampering. Therefore, the present invention preferably also includes a housing to encircle the activating member, such as a gear shift lever or a gas pedal.

The subject invention is directed to a device for preventing the movement of an automobile engaging member, such as a gas pedal, a fuel line conduit or a floor-mounted gear shift lever of an automobile, from a position of nonuse to a position useful for operating an automobile.

Five specific embodiments are of interest. The first embodiment includes an arcuate retaining lock which operates similar to a handcuff lock and which is mounted outside the gear shift lever console. The first embodiment includes a hingeable lock plate which is hingably located behind the gear shift lever and which includes a semi-circular cutout portion for receiving the gear shift lever thereby preventing its rearward movement. The second embodiment utilizes a similarly operating locking member but is contained within the gear shift lever console so as to be hidden from view. A third embodiment encloses and disables a gas pedal. A fourth embodiment includes a housing to isolate a gear shift handle. A fifth embodiment disables a fuel line from providing gasoline from a gas tank to an automobile engine.

The following patents, of interest are noted for anti-theft devices, namely, U.S Pat. No. 1,048,783 of Zolinski, U.S. Pat. No. 1,333,131 of Hendricks, U.S. Pat. No. 1,423,955 of Miller, U.S. Pat. No. 1,443,262 of Hinrichs et al., U.S. Pat. No. 3,431,755 of Eisenman, U.S. Pat. No. 3,631,694 of Teroux, U.S. Pat. No. 3,757,549 of Mullis, U.S. Pat. No. 3,777,518 of Meyers, U.S. Pat. No. 3,822,573 of Meyers, U.S. Pat. No. 3,968,665 of Kaufmann, U.S. Pat. No. 4,076,095 of Adamski, U.S. Pat. No. 4,282,769 of Sandrock, U.S. Pat. No. 4,596,303 of Tremblay, U.S. Pat. No. 4,693,099 of Cykman, U.S. Pat. No. 4,708,005 of Bernacchi, U.S. Pat. No. 4,747,279 of Solow, U.S. Pat. No. 4,817,405 of Gentry, U.S. Pat. No. 4,825,670 of Snow, U.S. Pat. No. 4,835,999 of Chant, U.S. Pat. No. 4,936,120 of Fiks, U.S. Pat. No. 4,972,693 of Inouye, U.S. Pat. No. 4,993,248 of Nordberg, U.S. Pat. No. 4,995,250 of Chiou, U.S. Pat. No. 5,003,798 of Kofman et al., U.S. Pat. No. 5,020,344 of Garcia, U.S. Pat. No., 5,033,281 of Kofman et al. and U.S. Pat. No. 5,038,667 of Slater.

U.S. Pat. No. 1,338,131 of Hendricks, discloses an automobile locking device which operates to maintain the gear shift lever in a neutral or inoperative position so that driving of a car by an unauthorized person is substantially prevented. The device includes a slot "H" adapted to receive a gear shift lever or the like and a lock "E" which holds the lever within the slot H, and that the hasp "B" has a swinging, hinged movement. With respect to this feature, this patent is illustrative of prior art devices generally disclosing automobile anti-theft devices which contact with the shift lever and which are pivotable or hinged into and out of a locking position.

U.S. Pat. Nos. 1,443,262 of Hinrichs and 4,817,405 of Gentry, disclose transmission or gear shift lever locks which are operable inside the console. The Hinrichs '262 patent has a locking mechanism including a pair of pivotally mounted oppositely disposed hook shaped members 12.

U.S. Pat. Nos. 1,048,783 of Zwolinski and 5,020,344 of Garcia are patents which are of general interest with respect to automobile locking and anti-theft devices. In Garcia, the fuel pump is electronically disabled, but the fuel line is not mechanically interrupted with a locking valve.

U.S. Pat. Nos. 3,631,694 of Teroux and 4,076,095 of Adamski describe locking devices which disable, but do not enclose, a gas pedal of an automobile. The remaining patents all generally disclose automobile locking or anti-theft devices which include an arcuate, U-shaped or handcuff-like locking member which receives the gear shift lever. The device disclosed in U.S. Pat. No. 4,825,670 of Snow is mounted in front of the shift lever and extends behind the lever to prevent rearward movement, while most of the remaining references are mounted behind the gear shift lever.

OBJECTS OF THE INVENTION

It is an object of the present invention to provide a automobile anti-theft locking housing which avoids the disadvantages of the prior art and which allows a lock to be firmly held in place without access to tampering, thereby providing a safeguard against theft or unauthorized operation of the automobile.

According to the preferred embodiment of the present invention, this object is attained with the device set out herein, in that a housing frame is provided in conjunction with a lock. This purpose is to provide a mechanism for engaging the lock housing in place.

DESCRIPTION OF THE DRAWINGS

This invention will now be described, by way of example, with reference to the accompanying drawings in which:

FIG. 7 is a perspective view of another embodiment of the invention.

FIG. 8 is a top plan view of the device along line 8—8 as shown in FIG. 7.

FIG. 9 is a front view of the device as shown in FIG. 7.

FIG. 10 is a perspective view of an alternate embodiment.

FIG. 11 is a sectional view of the device along line 11—11 of FIG. 10.

FIG. 12 is a close-up view of the device as in FIG. 10.

FIG. 13 is a close-up view of the device as in FIG. 10.

FIG. 17 is a perspective view in partial section of another embodiment of the present invention in a closed position.

FIG. 18 is a top view of the embodiment shown in FIG. 17.

FIG. 19 is a side sectional view of the device taken along line 19—19 of FIG. 18.

FIG. 20 is a top view of the embodiment shown in FIG. 17, in an open position.

FIG. 21 is a side sectional view of the embodiment shown in FIG. 20 in an open position.

FIG. 22 is a bottom view of the embodiment shown in FIG. 21, taken along line 22—22.

DETAILED DESCRIPTION OF THE DRAWINGS

Figure 1:
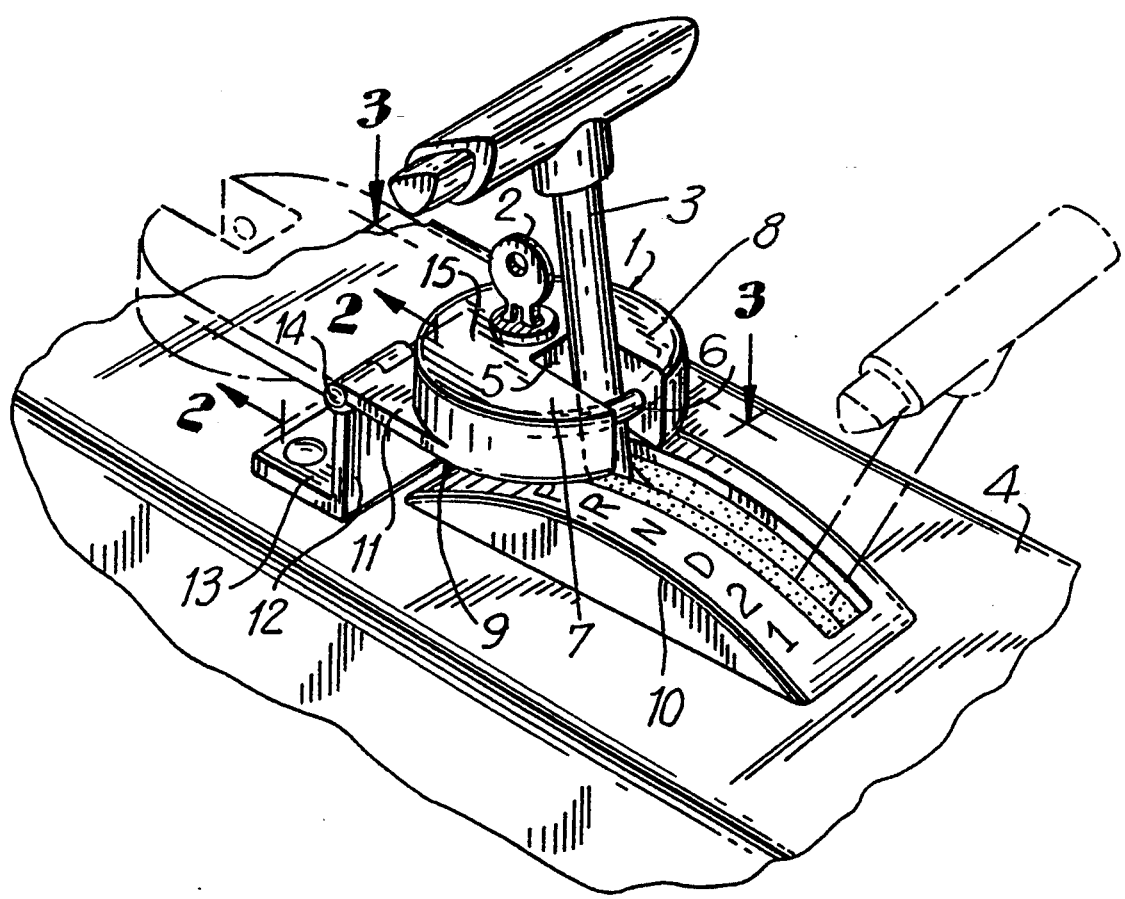
FIG. 1 is a perspective three-dimensional view of the device in accordance with one embodiment of the invention.

FIG. 1 shows a housing 1 for a lock 2 is provided as an anti-theft device for a gear shift lever 3 of a car, wherein the gear shift lever 3 extends upward from a console 4. The present invention includes a generally circular housing 1 having a indentation slot 5 for engagement of the lock 2 within engaging members 6 of a handcuff type lock wherein the gear shift lever is cradled between two forked ends 7 and 8 extending forward of the indentation slot 5 of the lock 2. The lock 2 is held in place by the housing 1 for the lock 2, which housing is mounted on a hingable support 9. The hingable support 9 has a height above the console 4 equal to the top of the shift selector 10 to permit the housing 1 for the lock 2 to rest upon the top of the shift selector 10. The hinged mechanism for the lock housing 1 includes a one hinged extension member 11 extending rearward from the housing 1 for the lock 2, hingably attached to a vertical bar member 12, which vertical bar member 12 is secured to the top face of the console 4 by a horizontal brace 13. The purpose of the housing 1 is to segregate the lock 2 from damage due to tampering. The housing 1 of the lock 2 makes it impossible to move the gear shift lever from a parked position. The lock 2 is not prone to tampering because the lock 2 is encased within housing 1, and because the lock is not combined with a more fragile component of the car, such as an emergency hand brake handle. The hinge 14 is operatively connected to the housing 1, wherein housing extension member 13 may assume a substantially horizontal position adjacent to shift selector 10. When the shackle lock engaging portion 6 of the lock 2 is disengaged, gear shift lever 3 is free to move forward.

It is noted that the height of the housing 1 for the lock 2 extends upward a distance equal to the height of the vertical bar member 12 hingedly attached to the hinged extension member 11, so that when the hinged extension member 11 is rotated 180 degrees, the top surface portion 15 of the housing 1 (bearing an aperture for a key) may now rest downward against the upper surface of the console 4, out of the way from interfering with a persons manual operation of the automobile.

This feature is different from prior art devices which have cumbersome connecting members engaging a gear shift lever with another portion of the car such as the emergency brake, which prior art locks must be disengaged and manually moved. For a person with physical disabilities such as arthritis, it is a hardship to manipulate these heavy locking members and inconvenient to store them in a convenient position in a car.

Figure 2:
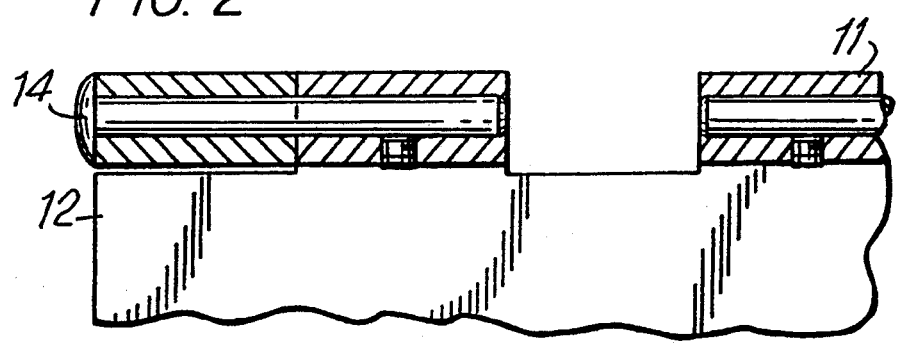
FIG. 2 is a side elevational view of the device as in FIG. 1.

FIG. 2 shows a cut-away sectional view of the hinged portion 14 of the lock housing 1, showing the hinged extension member 11 hingedly connected to the vertical bar member 12.

Figure 3:
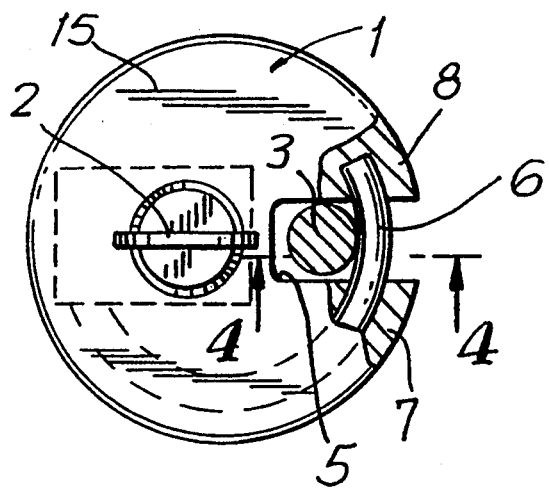
FIG. 3 is a top view of the device as in FIG. 1 in a locked position.

FIG. 3 shows a top view if the housing 1 for the lock 2 in partial section, showing in a cut-away view the handcuff type lock shackle member 6 encircling around the gear shift lever 3 in a desired secure position.

Figure 4:
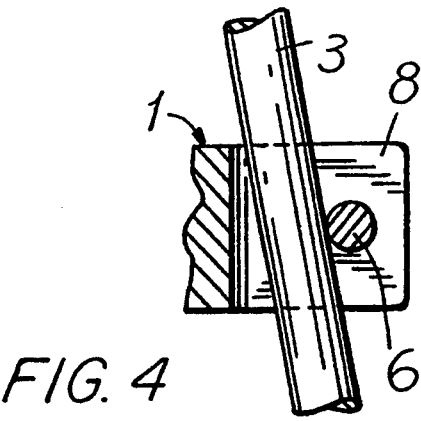
FIG. 4 is a close-up side elevational view of the device as shown along line 4—4 of FIG. 3.

FIG. 4 describes a portion of the gear shift lever 3 in a locked position, held in place by a lock engaging member 6 within the confines of the slot 5 formed between forked portions 7 and 8 within the circular housing 1 for the lock 2.

Figure 5:
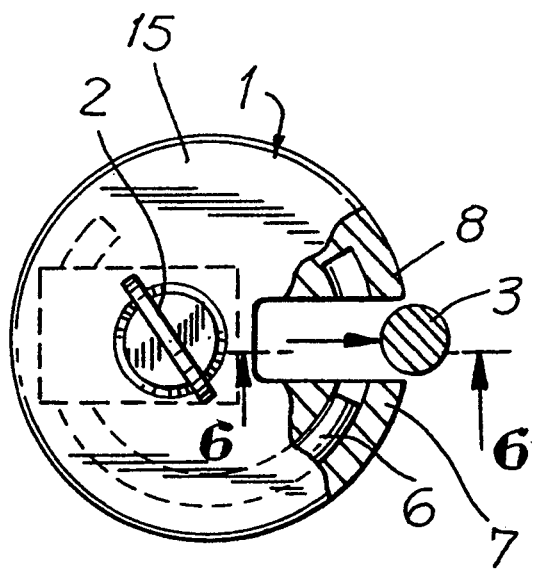
FIG. 5 is a top view of the device as in FIG. 1 in an open release position.

FIG. 5 shows a top view in partial section showing the locking engaging shackle member 6 disengaged away from the gear shift lever 3, permitting the gear shift lever 3 to move forwardly.

Figure 6:
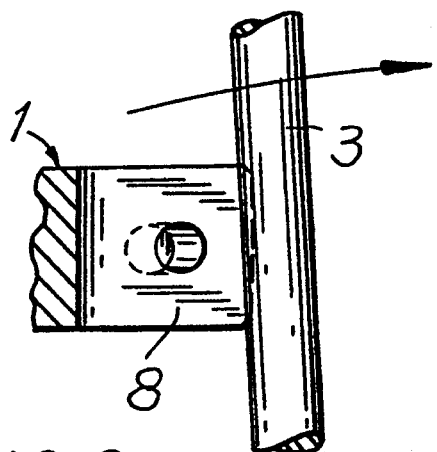
FIG. 6 is a close-up side elevational view of the device as shown along line 6—6 of FIG. 5.

FIG. 6 describes a close-up side elevational view of the gear shift lever 3 being removed from the locking position within the housing 1.

FIG. 7 is another embodiment of the device including a snap-on lock cover 20 to cradle the handle 21 of the gear shift lever 3 by preventing accessibility for releasing the gear shift lever 3 from a parked position to a position of engagement in a drive or reverse gear. In this embodiment, rather than encircling the lock, the cover circles the gear shift handle 21 itself. The cover housing 20 for the gear shift handle 21 includes a hollow rounded member 22, preferably cylindrical, having a releasable hatch mechanism truncated portion 23 of the housing 20 wherein a hatch is hingably connectable to the portion of the housing 20 to permit the insertion of the housing 20 over the gear shift handle 21. A lock 24 locks the hatch in place, preventing access to the gear shift handle 21.

FIG. 8 shows a top view showing by dotted line the gear shift handle 21 encased within the housing 20.

FIG. 9 describes a front elevational view showing the hatch 23 in an open position, and in dotted lines the hatch 23 in a closed position within the housing 20 encircling the gear shift handle 21.

FIG. 10, 11, 12 and 13 show an alternate embodiment wherein the gear shift console 31 acts as a housing for the lock 30. The lock 30 disables the gear shift lever 32 by a stopping the movement of linkage member 34, wherein the gear shift lever 32 is rendered immobile to a locking position. Lock 30 is mounted closely adjacent to link member 34, which extends from gear shift lever 32. Locking pin 37 of lock 30 locks link member 34 by inserting within an aperture 39 of cantilevered extension member 35, which extends outward from linkage member 34. Locking pin 37 extends in a direction perpendicular to an axis of cantilevered extension member 35.

Moreover, locking pin 37 is retreatable into lock 30 and away from aperture 39 to permit gear shift lever 32 to move from a park position of immobility.

Figure 14:
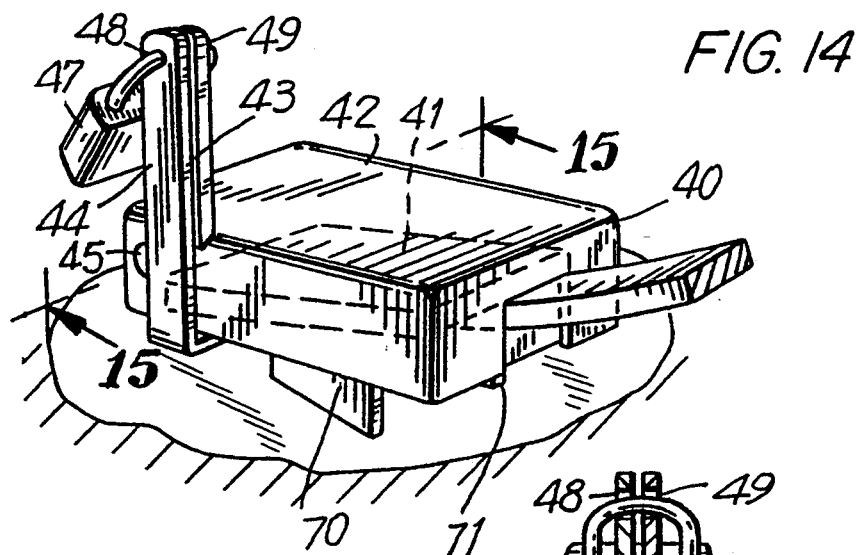
FIG. 14 is a perspective view of another embodiment of the Invention.
Figure 15:
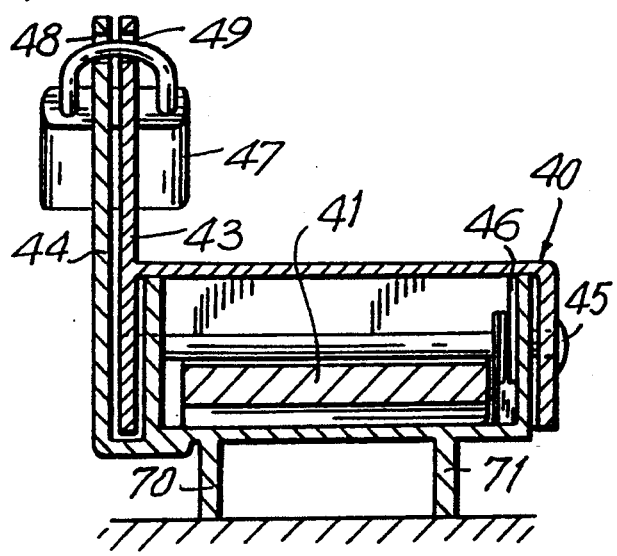
FIG. 15 is a front elevational sectional view of the device along line 15—15 of FIG. 14.
Figure 16:
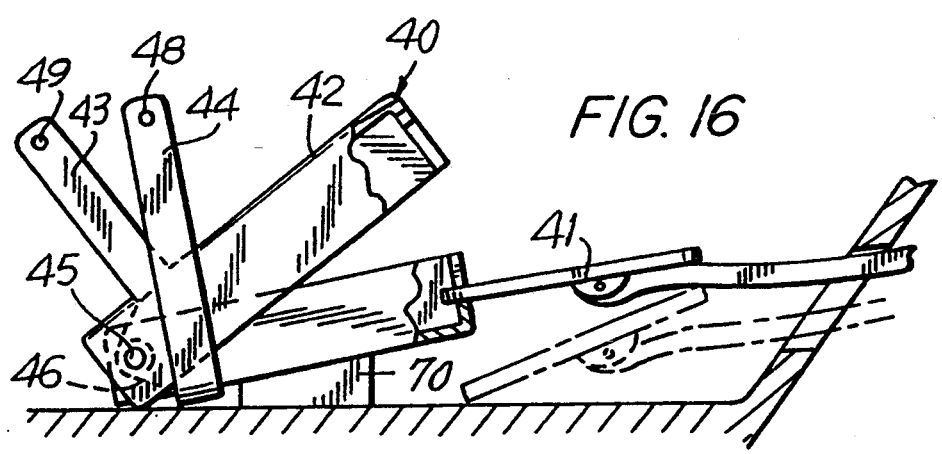
FIG. 16 is a side view in partial section of the device as show in FIG. 15.

FIG. 14 is an alternate embodiment for a housing 40 wherein the gas pedal 41 is locked in place. The invention includes a generally rectangular housing 42 which encloses and encircles the gas pedal 41. As shown in FIG. 14, the housing 40 includes two closeable levers 43 and 44 pivotable about a hinge member 45 and rendered apart from each other by means of a coil spring 46. Because of the inaccessibility of the gas pedal 41 underneath the dash board of an automobile, it is helpful to have a mechanism for releasing the housing cover 40 for the gas pedal 41 from the gas pedal 41 itself. This is accomplished by movement of the lever handles 43 and 44 together by the movement of the levers 43 and 44 closer together, which causes the closure of a top lid portion 42 of the housing 40 to move downward over the gas pedal 41. In this closed position, a padlock 47 may be inserted between two corresponding transverse holes 48 and 49 within the upper portion of the closeable levers 43 and 44. To disengage the padlock 47, one removes the padlock 47 from the transverse holes 48 and 49. By means of the coil spring, moving the levers 43 and 44 causes the levers to automatically open and thereafter cause the lid 42 for the housing 40 to move upward and away from the gas pedal 41.

Lever 43 is engageable with further lever 44 adjacent to the first lever 43. Levers 43 and 44 are moveable about an axle hinge portion 45, which is engageable with a coil spring to create tension so as to keep the levers 43 and 44 apart from each other except upon manual closing of the levers 43 and 44 together, thereby permitting the holes 48 and 49 within each lever 43 and 44 to form a through-hole for insertion of the padlock shackle 47 within the holes 48 and 49.

Placement of the gas pedal housing 40 upon the gas pedal 41 creates a blocking means to restrict a range of movement of the gas pedal 41 in a locked position, thereby preventing the movement of the car.

To immobilize the gas pedal, the gas pedal lock housing 40 in which in the gas pedal is secured, is placed at an oblique angle by means of two slanted leg portions 70 and 71, which rest flatly on the floor of the car but which extend the gas pedal housing 40 up at an angle from the hinge portion 45. In use, the levers 43 and 44 are actuated and to withdraw the upper cover portion 42 of the housing 40 away from the gas pedal 41, thereby releasing the gas pedal 41 for use.

It is noted that the levers 43 and 44 for the gas pedal housing 40 extend upward, which makes it easy for a user to reach down above the level of the floor without having to reach down to manipulate the housing 40 about the gas pedal 41.

FIGS. 17–22 depict a lock 50 closely adjacent to fuel line conduit 51. Lock 50 has an open and a closed position, the lock 50 including a locking extension pin 52 having a first longitudinal rod member 53 and a further end portion 54 extending down at an angle from first longitudinal rod member 53. Further end portion 54 is engageable with a second longitudinal rod member 55 having a base 56, with base 56 rotatable within valve seat 57 of valve 58. Valve seat 57 is mounted upon collar 59 surrounding fuel line conduit 51. Valve 58, which interrupts fuel line conduit 51, further includes a valve closure element 60 movable within fuel line conduit 51 in an open and a closed position to permit the flow of fuel therethrough. Valve closure element 60 moves responsive to the movement of further end portion 54 of locking extension pin 52 against second longitudinal rod member 55 of valve 58.

It is noted in all the aforementioned embodiments, the locks immobilize the engaging members, such as the gear shift lever or the gas pedal. When in place, these members can not be engaged, thereby preventing the theft or unauthorized movement of the car.

The present invention is not limited to the above described embodiments, but is limited solely by the appended claims. It is noted that other embodiments may be made, without departing from the spirit and scope of the appended claims.

I claim:

1. In combination, an automobile with a gasoline fuel line, a device for preventing the movement of fuel through a fuel line conduit of an automobile for operating the automobile, said device comprising a valve adapted to interrupt said fuel from flowing within said conduit, said valve having a valve seat mounted on a collar surrounding said fuel line and being rotatable between one position closing said fuel line conduit to prevent flow of said fuel and to another position opening said fuel line conduit to permit flow of said fuel to the engine of the automobile for securing said fuel line against unauthorized lock means including a locking extension pin having a first longitudinal rod member with an angularly bent middle portion extending horizontally from an annular edge of said lock means and a further end portion extending orthogonally to said middle portion of said first longitudinal rod member, such that the end portion is eccentrically spaced from said lock means, said further end portion being engageable with a second longitudinal rod member extending horizontally from a base being rotatable within said valve Seat, and a valve closure element movable within said fuel line moving in response to the movement of said further end portion against said second longitudinal rod member.

* * * * *